United States Patent [19]
Shaughnessy

[11] Patent Number: 5,930,782
[45] Date of Patent: *Jul. 27, 1999

[54] SYSTEM AND METHOD FOR MODIFYING AND OPERATING A COMPUTER SYSTEM TO PERFORM DATE OPERATIONS ON DATE FIELDS SPANNING CENTURIES

[76] Inventor: Daniel P. Shaughnessy, 3300 Rocky River Dr., Cleveland, Ohio 44111

[ * ] Notice: This patent is subject to a terminal disclaimer.

[21] Appl. No.: 08/854,841

[22] Filed: May 12, 1997

Related U.S. Application Data

[63] Continuation of application No. 08/342,841, Nov. 21, 1994, Pat. No. 5,630,118.

[51] Int. Cl.[6] .................................................... G06F 17/30
[52] U.S. Cl. ................................................ 707/1; 707/101
[58] Field of Search ..................... 707/1, 2, 101

[56] References Cited

U.S. PATENT DOCUMENTS

| | | | |
|---|---|---|---|
| 4,068,300 | 1/1978 | Bachman | 707/1 |
| 5,289,393 | 2/1994 | Kaya | 364/705.08 |
| 5,367,704 | 11/1994 | Hasuo et al. | 395/186 |
| 5,473,772 | 12/1995 | Halliwell et al. | 395/712 |
| 5,490,249 | 2/1996 | Miller | 395/183.14 |
| 5,719,826 | 2/1998 | Lips | 368/29 |
| 5,740,442 | 4/1998 | Cox et al. | 395/704 |

OTHER PUBLICATIONS

LE/370 Programming Guide, pp. 70–72, 485–487, 492, 493, 495 and 496 (date unknown–admitted prior art), no date.

*Primary Examiner*—Wayne Amsbury
*Assistant Examiner*—Cheryl Lewis
*Attorney, Agent, or Firm*—Renner, Otto, Boisselle & Sklar, P.L.L.

[57] ABSTRACT

The present invention relates to a method for modifying and operating a computer system to perform date operations including the steps of storing at least one subroutine for performing the date operation, modifying the application program to include a call to at least one of the subroutines, the call operative to pass at least one date field representative of at least two dates to the subroutine which has been called, wherein the subroutine determines which of the at least two dates corresponds to the date field according to a predetermined criteria performs a date operation on the date field, and returns a code to the application program for use by the application program in its further operations.

19 Claims, 9 Drawing Sheets

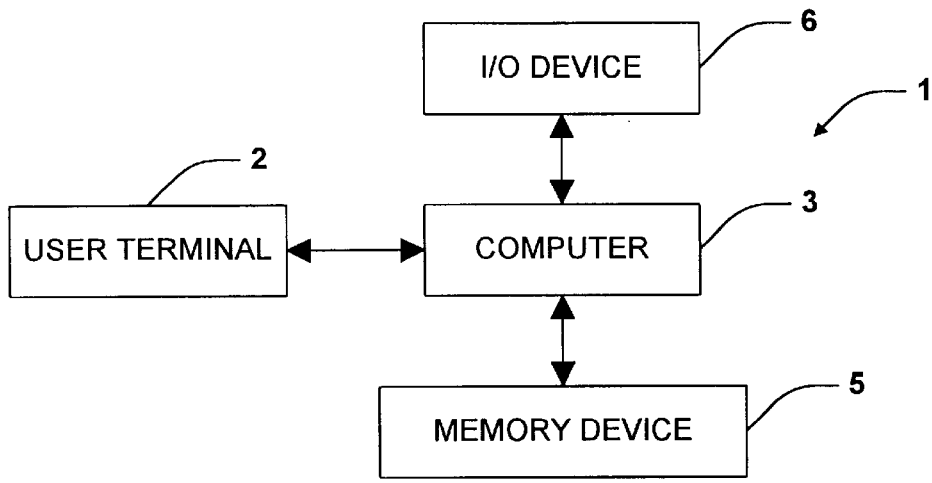
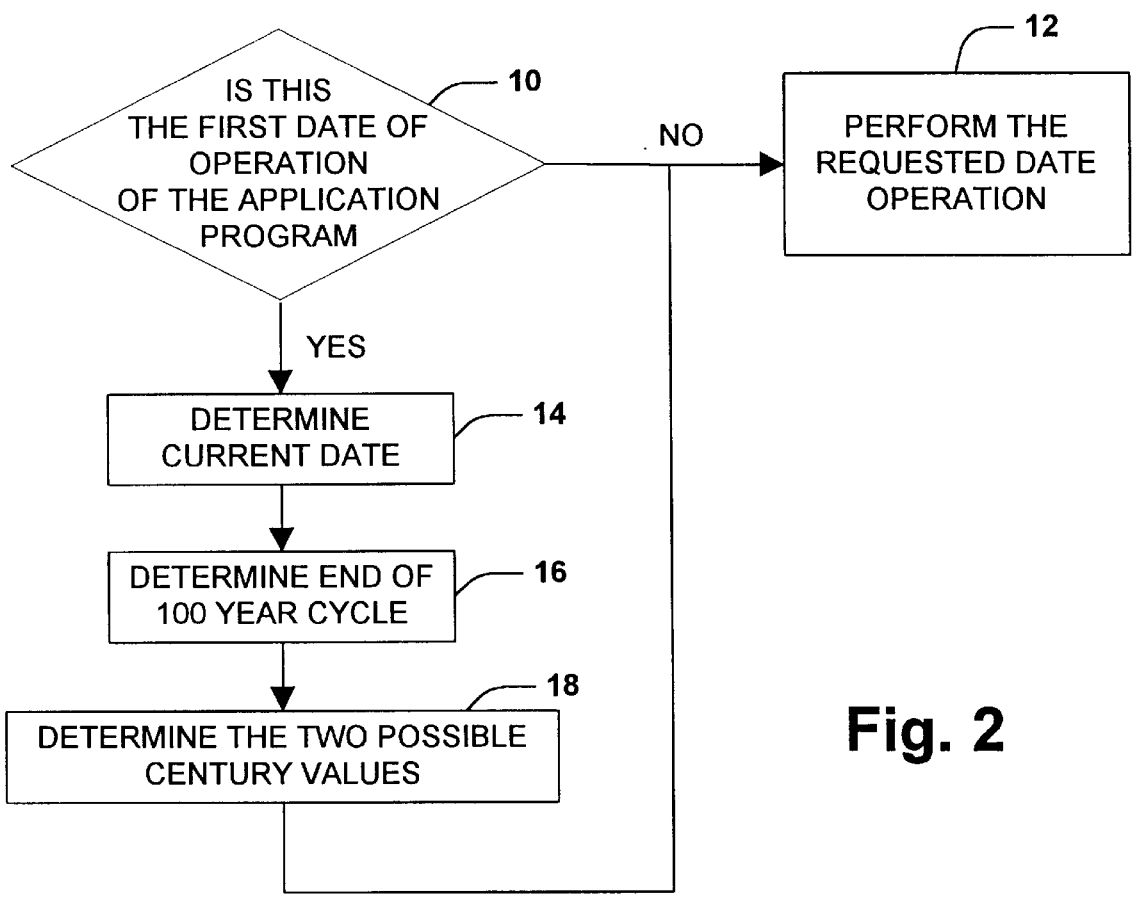
Fig. 1
Fig. 2

SYSTEM AND METHOD FOR MODIFYING AND OPERATING A COMPUTER SYSTEM TO PERFORM DATE OPERATIONS ON DATE FIELDS SPANNING CENTURIES

This is a continuation of application Ser. No. 08/342,841, filed Nov. 21, 1994, U.S. Pat. No. 5,630,118.

TECHNICAL FIELD OF THE INVENTION

The present invention relates to a system and method for modifying and operating a computer system to perform operations on date fields. More particularly, the present invention relates to a system and method for modifying and operating a computer system to perform date operations on date fields having a two digit representation for the year without erroneously mistaking the years 2000 et seq. for the years 1900 et seq.

BACKGROUND OF THE INVENTION

In the year 2000, an interesting problem will face companies whose computer systems utilize dates having a two digit representation for the year. In the current format, the year 2000, 2001, et seq. will be represented by the two digit codes of 00, 01, et seq. Accordingly, these computer systems will be unable to distinguish between the year 2000 and the year 1900, for example, as the latter is also represented by the two digit code 00. Thus, if the computer system was, for example, to compare dates such as 1994 and 2000 to determine which was greater, an erroneous result would occur as the system would interpret the two digit representation of year 2000 (i.e., 00) as being less than the two digit representation of year 1994 (i.e., 94).

One solution to this problem would be to convert all dates within the application system of the computer to use date fields with four digit representations for the year. This, however, is a relatively expensive solution for a variety of reasons. First, this solution requires the creation and testing of programs to convert all date fields in all application files. Second, this solution requires the creation and testing of all modifications to all date field processing routines currently used by the application system. Finally, this solution requires conversion of all files to the new formats together with implementation of all of the modified application processing routines. Other problems with this solution, apart from the cost, include the significant amounts of system outage during the file conversions and the large amount of coordination required to prepare for the conversion while still accommodating normal maintenance activity.

Therefore, it would be advantageous to have a solution to this problem which does not suffer from the problems associated with the above-mentioned solution. It would be advantageous to have a solution which minimizes the coordination efforts necessary to implement the solution. It would be advantageous to have a solution which minimizes the "down time" experienced by the application system. Finally, it would be advantageous to have a solution which could be implemented in a piecemeal manner as part of the normal program maintenance activity.

SUMMARY OF THE INVENTION

The present invention enables all of the above advantages to be obtained. The present invention provides a method which can be used to modify current application processing logic whose date operations would fail as a result of its use of date fields having a two digit representation for the year, as such date fields could represent at least two dates, i.e., a date from the current century as well as a date from a subsequent century. For example, the two digit code "00" could be representative of either the year 1900 or the year 2000. Further, the present invention provides a method of modifying the current application processing logic of a computer system so that it may perform its date operations regardless of the current format of the date field. An advantage to this approach is that program modifications can be made one program at a time as opposed to all at once. Further, the modifications can be performed as part of normal maintenance activity, rather than in conflict with it. Accordingly, difficult coordination efforts and system outages normally associated with a major system conversion can be avoided.

According to one aspect of the invention, a method for modifying a computer system to perform date operations includes the steps of storing at least one subroutine for use by the computer system, and modifying an application program of the computer system that uses a two digit date representation for the year to include at the location of a date operation a call to said one subroutine. The call is operative to pass at least one date field which is representative of at least two dates to the subroutine which has been called. The subroutine is operative to determine which of the at least two dates corresponds to the date field according to a predetermined criteria, perform the date operation on the passed date field and return a parameter representative of the result of the date operation to the application program for use by the application program in its further operations. Preferably, a plurality of subroutines are stored that perform respective date operations selected from the group consisting of a date conversion operation, a date comparison operation, a date difference calculation operation, etc.

In a preferred embodiment of the invention, the subroutine converts the date field into a new format with at least a three digit representation of the year and performs the date function on the passed date field in the new format. More particularly, the date field may be converted into a format with a four digit representation for the year by assigning a century value. In the preferred embodiment, the parameter the subroutine returns to the application program can be either a date field and/or a code indicative of a result of the date operation having been performed. Additionally, the call may be operative to pass two date fields having a two digit representation of the year to the subroutine, for example, if the subroutine is to perform a date comparison.

According to another aspect of the present invention, an electronic computer system is provided for performing date operations on date fields having a two digit representation for the year, the system having at least one subroutine for converting a date field into a new format and for performing a particular date operation on the date field in its new format, an application program modified to include a call to said one subroutine, a means for passing at least one date field to the subroutine, and a means for returning a parameter to the application program for use by the application program in further operations.

According to a further aspect of the present invention, a method of operating a computer system so as to perform date operations on date fields is provided. The method includes the steps of calling a subroutine from an application program, passing at least one date field which is representative of at least two dates to the subroutine, determining which of the at least two dates corresponds to the date field according to a predetermined criteria, performing the date operation on the date field, and returning a parameter to the application program for use by the application program in further operations.

The foregoing and other features of the invention are hereinafter fully described and particularly pointed out in the claims. The following description and the annexed drawings set forth in detail a certain illustrative embodiment of the invention, this being indicative, however, of but one of the various ways in which the principles of the invention may be employed.

BRIEF DESCRIPTION OF THE DRAWINGS

FIG. 1 is a schematic block diagram of a computer system that may be used to practice the present invention.

FIG. 2 is a flowchart illustrating the steps the modified computer system performs when first encountering a date operation.

DETAILED DESCRIPTION

Figure 3:
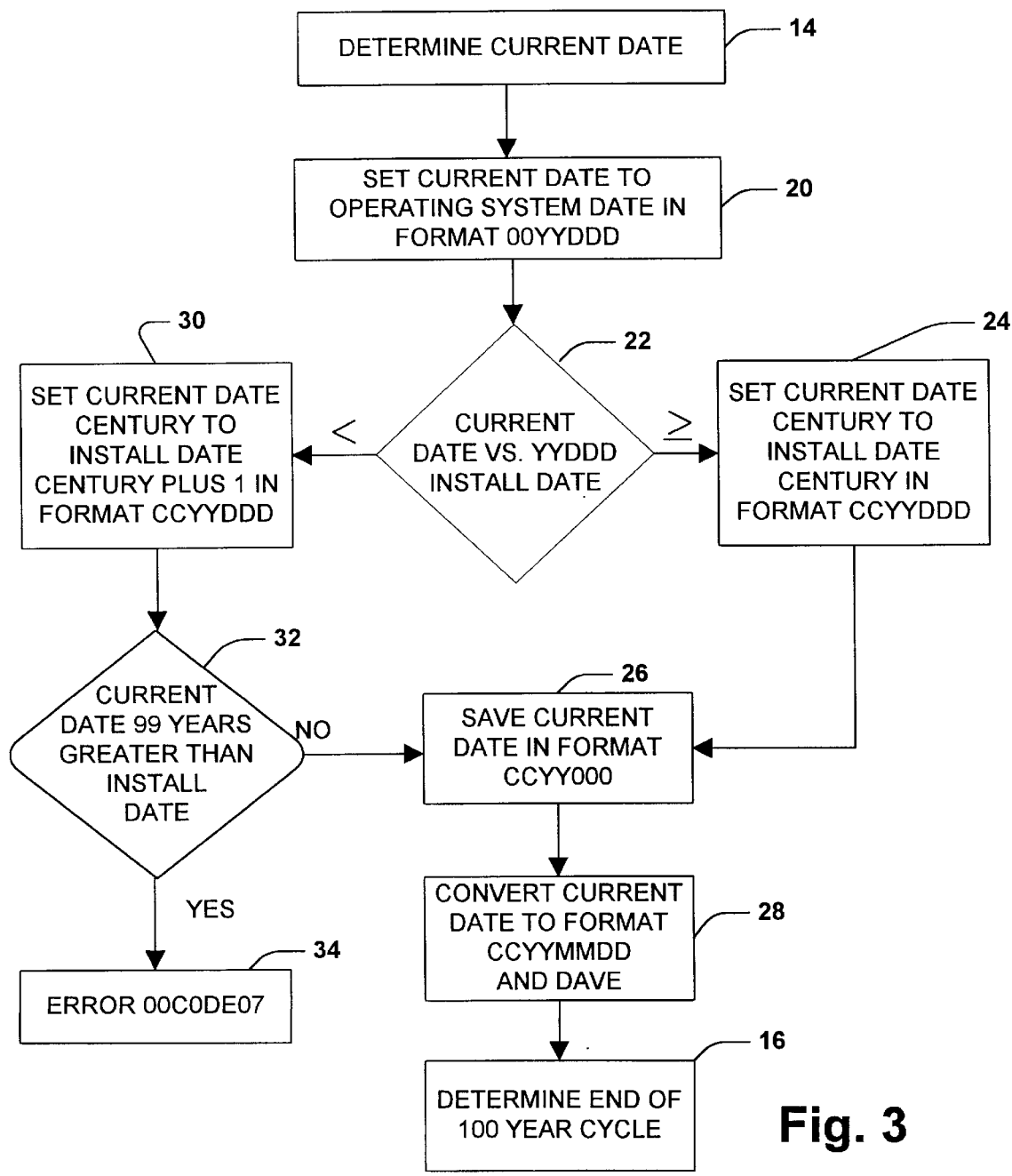
FIG. 3 is a flowchart illustrating the steps the modified computer system performs to determine the current date.

The present invention provides a method of modifying an existing computer system whereby regardless of the date format currently utilized by an application program running in the computer system, the date operations that the application program performs can be performed correctly even when processing dates after Dec. 31, 1999. The table attached as the Appendix illustrates a sample of the types of date formats the present invention can support.

FIG. 1 illustrates an exemplary computer system 1 that may be modified in accordance with the principles of the present invention. One or more user interface devices, such as a terminal 2 including a keyboard and monitor, are connected to a computer device 3 such as a main frame computer, minicomputer, microprocessor, etc. The computer device 3 may include or be connected to an internal or external memory device 5, and also to other input or output devices 6.

The operation of computer 3 is generally governed by an application program. The application program controls the computer's performance of a specific job or task. For example, WordPerfect®, a registered trademark of the WordPerfect Corporation, is an application program which controls the word processing operations of a computer. Similarly, there are a multitude of other application programs which may be used by a computer to control other operations.

A particular application program may perform a number of different operations, such as WordPerfect® which can, for example, check spelling, move text, and search for key words within a text. Each of the particular functions that an application program performs may be encoded as a routine nested within the body of the application program. Accordingly, an application program may include as one or more of its nested routines a date operation such as a date comparison.

The date operations encoded in current application programs may perform the operation using a two digit representation for the year. If this is the case, the date operations may be erroneously performed when processing dates after Dec. 31, 1999 for the reasons discussed previously. One possible solution to this problem would be to reprogram the date operation routine(s) currently in the application program to perform the date operation using a format which has, for example, a three or four digit representation for the year. To implement this solution, the current date operation routine(s) in the application program would have to be reprogrammed to perform the date operation on a date field which has a three or four digit representation for the year. Furthermore, the files which contain the data for the date operation routine(s) would also have to be converted to include date fields having a three or four digit representation for the year. This could be an expensive and time consuming process. A more expedient, less expensive solution to the problem would be to modify the computer system in accordance with the principles of the present invention.

In accordance with the present invention, the current date operation routines nested in the body of the application program would be replaced with a call to one of a plurality of subroutines stored externally from the existing application program, as opposed to the date operation routine being reprogrammed to perform the date operation in a new format. The subroutines will be able to accommodate the date format currently employed by the application program, thus making it unnecessary to convert all of the date fields in files containing data used by the application program over to the new date format. For example, if an application program for a bank performed a date comparison to determine when loan payments were overdue, the point in the source code which previously performed the comparison may have program statements which performed the following functions:

1. Compare date next payment is due to today's date;
2. If the date next payment is due is greater than today's date, indicate that the account is OK.

If the system which ran the above application program were modified in accordance with the principles of the present invention, then the program statements which performed the above functions would be modified to include program statements which did the following:

1. Call the subroutine which performs the date comparison passing today's date, the date next payment is due, and a three byte parameter, the first byte of which identifies the format of today's date, the second byte of which identifies the format of the date next payment is due, and the third byte of which is left available for a return code indicative of a result of the comparison;
2. If the result received from the subroutine indicates that the date next payment is due is greater than today's date, indicate that the account is OK.

The subroutines which perform the date operations can do so regardless of the format of the dates to be operated on. The mechanics of how the subroutines perform the date operation on dates having different formats will be described later. However, for the subroutines to be able to accommodate different date formats, certain information, namely the current date, end of 100 year cycle, and two possible century values, must be determined and made available to the subroutines. Preferably, each subroutine that performs a date operation will include a call to another subroutine which can determine this information. However, the information will only have to be determined during the first date operation performed in a given application program, even though the application program may perform a date operation several times, or may perform several different date operations. Therefore, as illustrated in FIG. 2, whenever a call to a date operation subroutine is encountered in a modified application program, it must first be determined if this is the first date operation of the application program (box 10). If it is not the first date operation, then the date operation will be performed without first exiting to the subroutine which calculates the above information (box 12). If it is the first date operation, the subroutine which determines the current date (box 14), the end of the 100 year cycle (box 16), and the two possible century values (box 18) will be called and the information calculated before the date operation is performed. The above-mentioned information will be used in the subroutine(s) to assign a century value to the two digit representation of the year of the dates to be operated on such that the subroutine can accurately perform its intended function. FIGS. 3–7 illustrate how a computer system (computer system and system will be used interchangeably throughout the remainder of the specification) modified in accordance with a preferred embodiment of the present invention calculates the above-mentioned information and assigns century values to the dates to be operated on.

First, as illustrated in FIG. 3, the current date is determined (box 14) in a format which utilizes a four digit representation for the year. Initially, the current date is set to the operating system date in the format OOYYDDD (box 20). By way of example, Sep. 20, 1994 would appear as 0094263, i.e.,;day number 263 of the year 1994. The current date is then compared to the date the system was installed with the modifications (modified system install date) (box 22), which, for the sake of example, is 1994032, i.e., day number 32 of the year 1994, or Feb. 1, 1994. If the YYDDD portion of the current date, 94263, is greater than or equal to the corresponding portion of this modified system install date, 94032, which in this case it is, then the century of the current date is set to the century of the modified system install date (box 24). In this case, the century value of the modified system install date is 19. The current date is then modified to include this century value and thus appears as 1994263 instead of 0094263, and stored (box 26). The current date is also converted into the format CCYYMMDD and stored (box 28). Thus, the current date for this example would also be stored as 19940920.

If the current date appeared less than the modified system install date (box 22) in the OOYYDDD format, as would be the case if the current date was 0000001, i.e., Jan. 1, 2000, then the current date century would be set in the format CCYYDDD to the century value for the modified system install date plus one CCYYDDD (box 30). Under these circumstances, the current date would be assigned a century value of 20, the century value for the modified system install date, 19, plus 1. Therefore, the current date would be stored as 2000001 instead of 0000001. The current date with the century value assigned is once again compared to the modified system install date to ensure that it is no more than 99 years greater than the modified system install date (box 32). If it is, then a system error occurs (box 34), indicating that the system was installed more than 99 years ago and should be reinstalled. If it is not 99 years greater than the modified system install date, the current date is saved as 20000001 (box 26) and also converted into the YYYYM-MDD format, 20000101, and saved (box 28).

Figure 4:
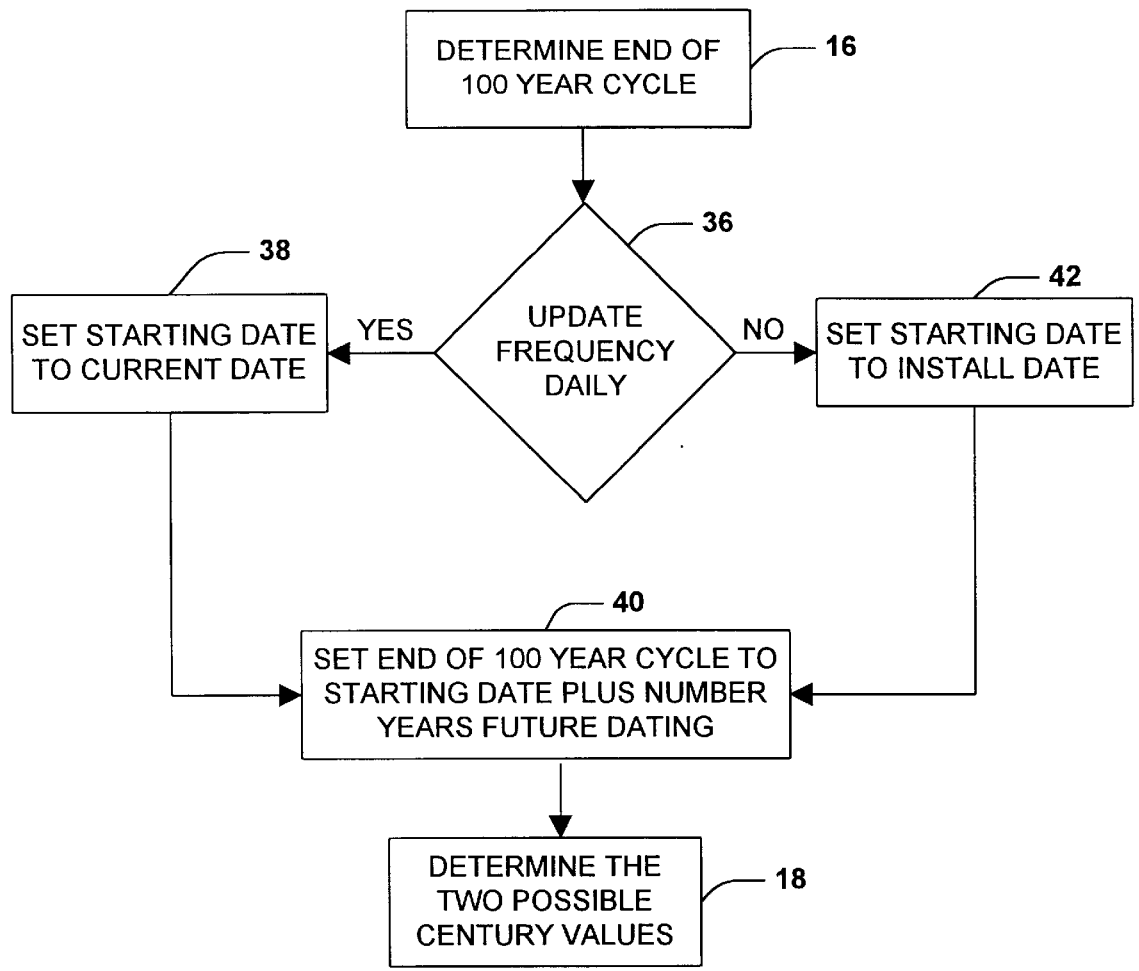
FIG. 4 is a flowchart illustrating the steps the modified computer system performs to determine the end of the 100 year cycle.

Once the current date has been determined, the end of the 100 year cycle (cycle) is determined (box 16). FIG. 4 illustrates the steps performed to determine the end of the 100 year cycle. When a system is modified according to the principles of the present invention, several parameters may be specified. The parameters may include the number of years of future dating required (default is 10), the type 2 format, CCYYMMDD, for the modified system install date (default is 19931231), and whether the end of the 100 year cycle is to be updated daily (0 indicates no update of the cycle, 1 indicates daily update of the cycle; default value is 1). The first step in determining the end of the 100 year cycle is therefore determining the update frequency for the cycle (box 36). If the cycle is to be updated daily, then the starting date is set to the current date (box 38), as determined above. Therefore, for this example the starting date would be 20000101 if the cycle is to be updated daily. Next, the end of the 100 year cycle is determined by adding the number of years of future dating required to the starting date (box 40).

For example, if when the modified system was installed none of the parameters were set, the default values would be used by the system. Therefore, if the current date was as above, 20000101, the end of the 100 year cycle would be 20100101, or Jan. 1, 2010, i.e., 10 years from the current date. Hence, the 100 year cycle would be from Jan. 2, 1911 to Jan. 1, 2010.

However, if the update frequency was set to 0 when the modified system was installed, then the starting date would be set to either the date entered during modification, or the default date of Dec. 31, 1993 (box 42). In this manner, the 100 year cycle may be fixed, as opposed to having it change as the operating system date changes.

Figure 5:
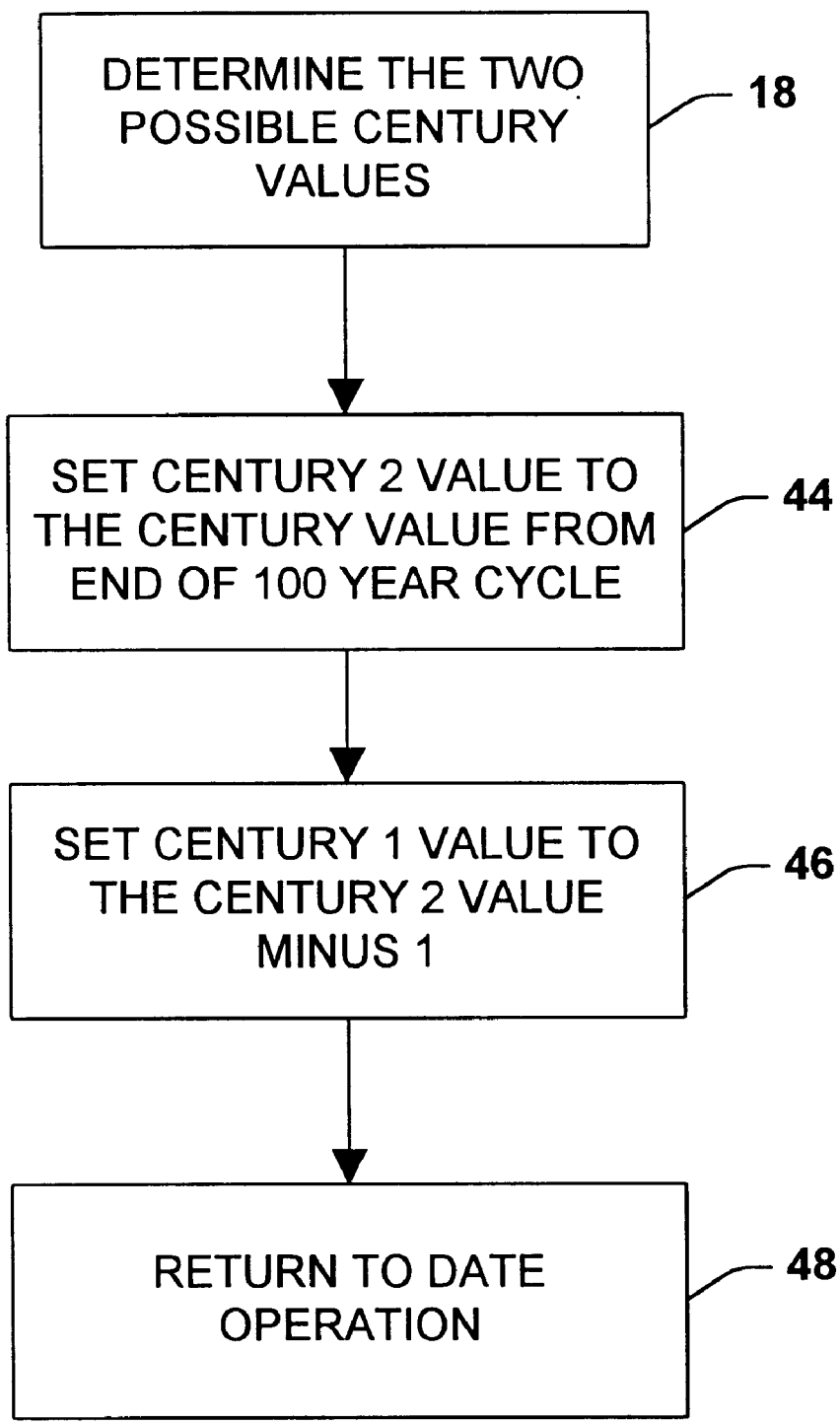
FIG. 5 is a flowchart illustrating the steps the modified computer system performs to determine the two possible century values.

Two other parameters which are set are the two possible century values (box 18). FIG. 5 shows how this is accomplished. The first possible century value, for example, CENTURY2, is set to the century value for the end of the 100 year cycle (box 44). In the case of our example, CENTURY2 would be set to 20. The other century value, CENTURY1, is then set to the CENTURY2 value minus one (box 46). For the example, CENTURY1 would be set to 19. Once the two century values are set, the system returns to the particular subroutine it is currently using (box 48).

Figure 6:
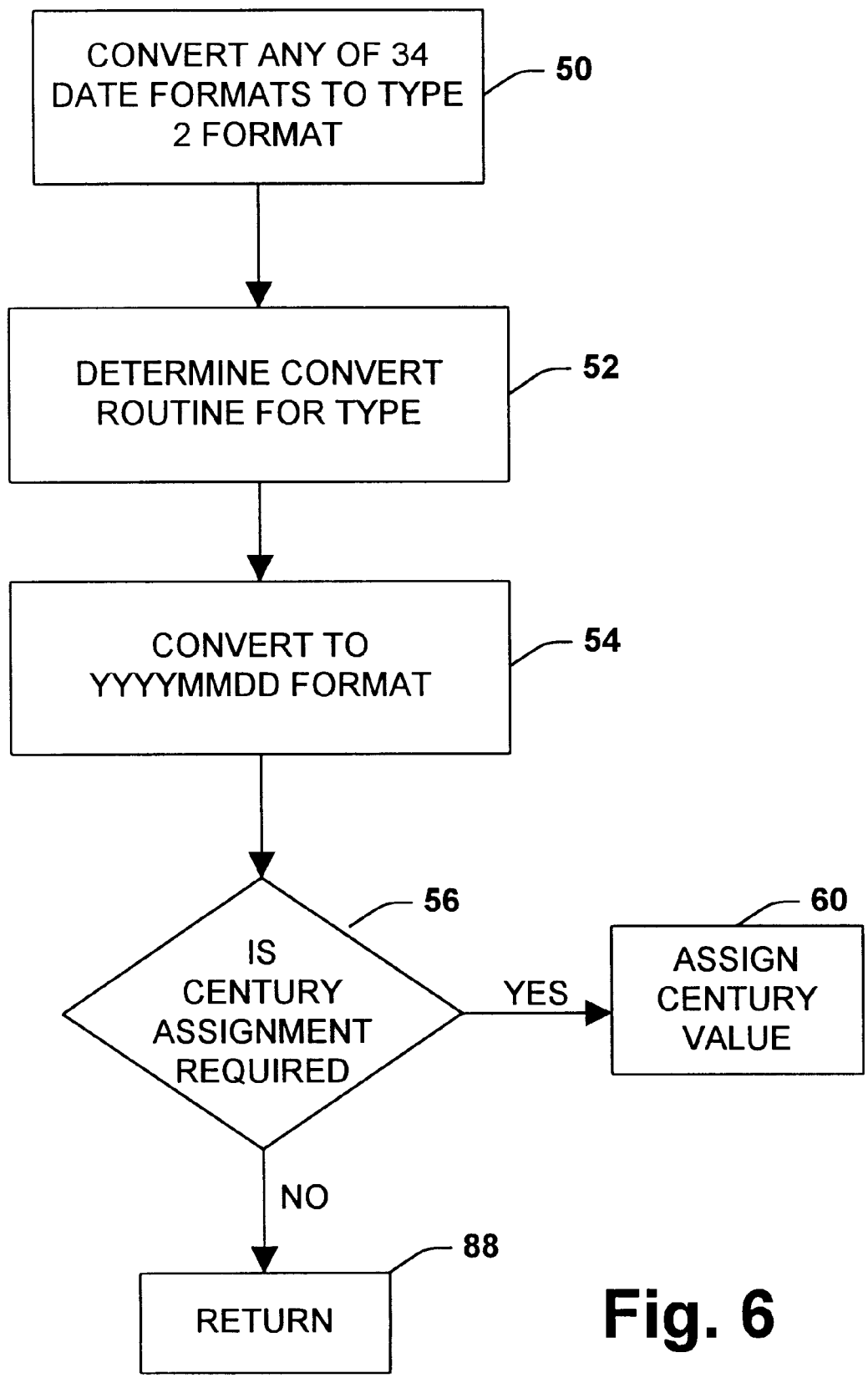
FIG. 6 is a flowchart illustrating the steps the modified computer system performs to accommodate dates regardless of the current format employed by its application program.
Figure 7:
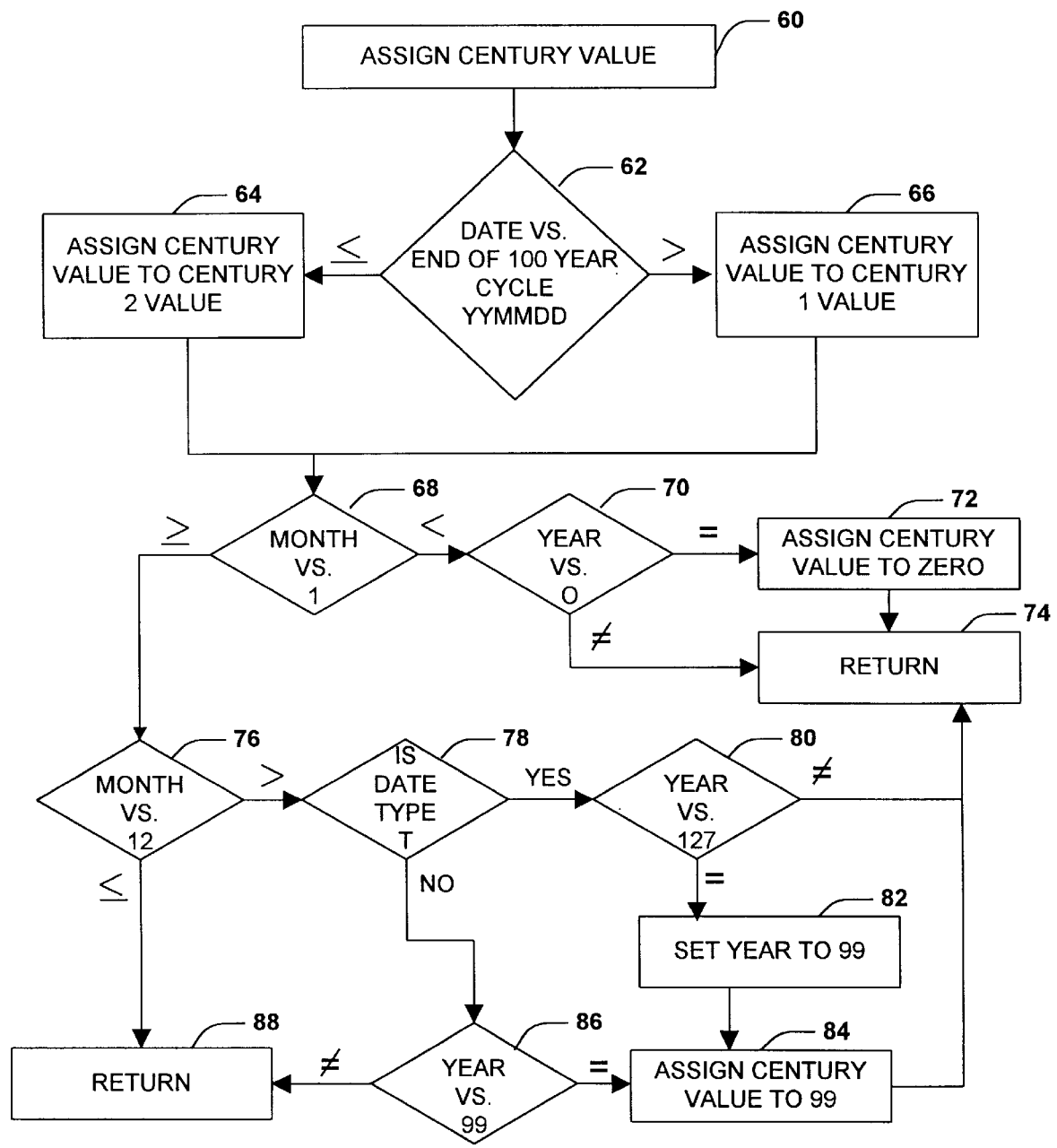
FIG. 7 is a flowchart illustrating the steps the modified computer system performs to assign a century value.

Thus, having set these parameters, a century value can be assigned to a two digit representation of the year based upon where the year falls in the current 100 year cycle. For example, assuming we are in the 100 year cycle as calculated above, the years 1911 through 1999 would be assigned to dates with year values 11 through 99, the years 2000 through 2009 would be assigned to dates with year values 00 through 09, and the year 2010 would be assigned to Jan. 1, 10. The year 1910 would be assigned to all other dates with a year value of 10. FIGS. 6 and 7 best illustrate how this century assignment is accomplished.

The illustrated embodiment utilizes a base date format, format 2, i.e., YYYYMMDD. Accordingly, in any date operation that a computer system modified in accordance with principles of this embodiment performs, the dates to be operated on will first be converted from their original format into a type 2 format (box 50), as illustrated in FIG. 6. To this end, it is first determined which convert routine is required (box 52), after which the date(s) are converted into the YYYYMMDD, type 2, format (box 54). The program steps required to convert a date from its original format into its type 2 equivalent can be readily determined by one skilled in the art and are therefore not discussed in detail herein. If the original date format only provided a two digit representation of the year, then the first two digits for the year, those that correspond to the century, would both be zero at this point. Accordingly, century assignment is required (box 56).

FIG. 7 illustrates how such century assignment is accomplished (box 60). First, the YYMMDD portion of the type 2 date is compared to the corresponding portion of the end of 100 year cycle date (box 62). If the date is less than or equal to the end of 100 year cycle date, the CENTURY2 value is assigned to the date (box 64). If the date is greater than the end of cycle date, the CENTURY1 value is assigned to the date (box 66). Once the century assignment is completed, the system continues on to assign some special type 2 equivalents when the type 2 value is not a valid date.

For example, it may be desirable to set a date which compares low to all other dates, such as when the information is not known when the data file is created. In such a case, the current representation for such a date is most commonly 000000. Therefore, if a date field is encountered where the month value is zero (box 68), and the two digit year value is also zero (box 70), the century value will also be set to zero (box 72). The date returned (box 74) will thus always compare low to any other date. On the other hand, it may be desirable to have a date that always compared high to other dates such as when there is a hold on a bank account that should be removed, not automatically expire. Currently, systems will assign a date which has the highest year value for the particular format being used, and a month value greater than 12, as such a date will be greater than any other valid date. For example, in most systems with a two digit representation for the year, the year value is 99. However, for those systems which currently use a type T format, YYYMMDD, the highest year value is 127. Therefore, when the modified system encounters such a date it should recognize that the date is one that should compare high to all other dates and assign a century value accordingly. To this end, it would be advantageous to assign a century value of 99 such that the date will continue to compare high to all other dates. To accomplish this, it is first determined if the month is greater than 12 (box 76) and if the date is in type T format (box 78). If it is in the type T format, then the year will be compared to 127 for the reasons mentioned above (box 80). If the year equals 127, then the year (box 82) and the century value (box 84) will both be set to 99 in the equivalent type 2 format for the date so that the returned date (box 74) will always compare high to other dates. If the date type is not type T (box 78), then the year is compared to 99 (box 86). If the year is equal to 99 (box 86), then the century value is also assigned to 99 (box 84) so that once again the returned date (box 74) will always compare high to other dates. If the month value is less than or equal to 12 (box 76) or a date format other than type T with a year not equal to 99 (box 86), the date is simply returned with the century value as originally assigned (box 88).

This concept of century assignment is better illustrated by way of example. In the example discussed previously, the following parameters were set:
1. End of 100 year cycle=20100101, i.e., Jan. 1, 2010;
2. CENTURY1=19; and
3. CENTURY2=20.

Therefore, if the date requiring century assignment is Sep. 20, 1994, which in the commonly used format of YYMMDD is 940920, it is first converted into its type 2 format, which at the initial conversion is represented by 00940920 (box 50). To assign the century, the YYMMDD portion of this date is compared to the YYMMDD portion of the end of 100 year cycle date (box 62). Since 940920 is greater than 100101, the system will assign this date the CENTURY1 value (box 66) of 19. Thus, the type 2 equivalent of Sep. 20, 1994 will now correctly be represented by 19940920.

Accordingly, regardless of the date format currently used by an application program, date operations can be properly performed. All that is required is a modification of the application program to include calls to a plurality of different subroutines which will convert the date format currently employed by the application program into a type 2 format (or other century significant date format, if desired), assign a century value if necessary, perform the date operation, and return the result for further use by the application program.

The preferred embodiment of a system modified in accordance with the principles of the present invention will now be further described in relation to some of the specific date operations that can be performed.

DATE COMPARISON

The application program currently operating in a particular computer system may have a comparison of two date fields as part of its operation. If so, the source code which performs this comparison can be replaced with a call to DS2000R1, the name given to an exemplary comparison subroutine useful in practicing the present invention (box 100). For example, as previously mentioned, if the application program was written in COBOL, and the program was using date format type D, the current program statements might be as follows:

```
        ...
05      TODAY                       PIC 9 (7)    COMP3.
        ...
05      DATE-NEXT-PAYMENT-DUE       PIC 9 (7)    COMP3.
IF DATE-NEXT-PAYMENT-DUE IS GREATER THAN
TODAY GO TO 0270-ACCT-OK.
```

With the present invention, the program statements may be modified as follows:

```
        ...
05      TODAY                       PIC 9 (7)    COMP3.
        ...
05      DATE-NEXT-PAYMENT-DUE       PIC 9 (7)    COMP3.
        ...
DS2000-PARAMETER-3.
05      DS2000-FORMAT-FIELD-A       PIC X(1)     VALUE 'D'.
05      DS2000-FORMAT-FIELD-B       PIC X(1)     VALUE 'D'.
05      DS2000-RETURN-CODE          PIC X(1)     VALUE SPACES.
        88 A-LESS-THAN-B                         VALUE 'X'.
        88 A-EQUAL-TO-B                          VALUE 'Y'.
        88 A-GREATER-THAN-B                      VALUE 'Z'.
        ...
CALL 'DS2000R1' USING DATE-NEXT-PAYMENT-DUE,
TODAY, DS2000-PARAMETER-3.
IF A-GREATER-THAN-B
GO TO 0270-ACCT-OK
        ...
```

If the application program was written in ASSEMBLER, and using the type D date format, the current program statements might read:

| | | | |
|---|---|---|---|
| TODAY | . . .<br>DS | PL4 | DATE VALUE FOR TODAY, OYYMMDDS. |
| NXTPMT | . . .<br>DS | PL4 | DATE NEXT PAYMENT DUE, OYYMMDDS. |
| | . . .<br>CLC | NXTPMT, TODAY | IS NEXT PMT GREATER THAN TODAY |
| | BH<br>. . . | ACCT 270 | YES, ACCOUNT IS CURRENT |

To use the present invention, the program statements may be modified to read:

| | | | |
|---|---|---|---|
| TODAY | . . .<br>DS | PL4 | DATE VALUE FOR TODAY, OYYMMDDS. |
| NXTPMT | . . .<br>DS | PL4 | DATE NEXT PAYMENT DUE, OYYMMDDS. |
| DS2000P3 | . . .<br>DS | 0X | PARAMETER 3 |
| DS2000FA | DC | C'D' | FORMAT OF DATE FIELD A |
| DS2000FB | DC | C'D' | FORMAT OF DATE FIELD B |
| DS2000RC | DC | C" | RETURN CODE: X, Y, OR Z. |
| ***  | . . .<br>CALL | DS2000R1, | (NXTPMT, TODAY, DS2000P3) IS NEXT PMT GREATER THAN TODAY |
| | BH<br>. . . | ACCT270 | YES, ACCOUNT IS CURRENT |

Figure 8:
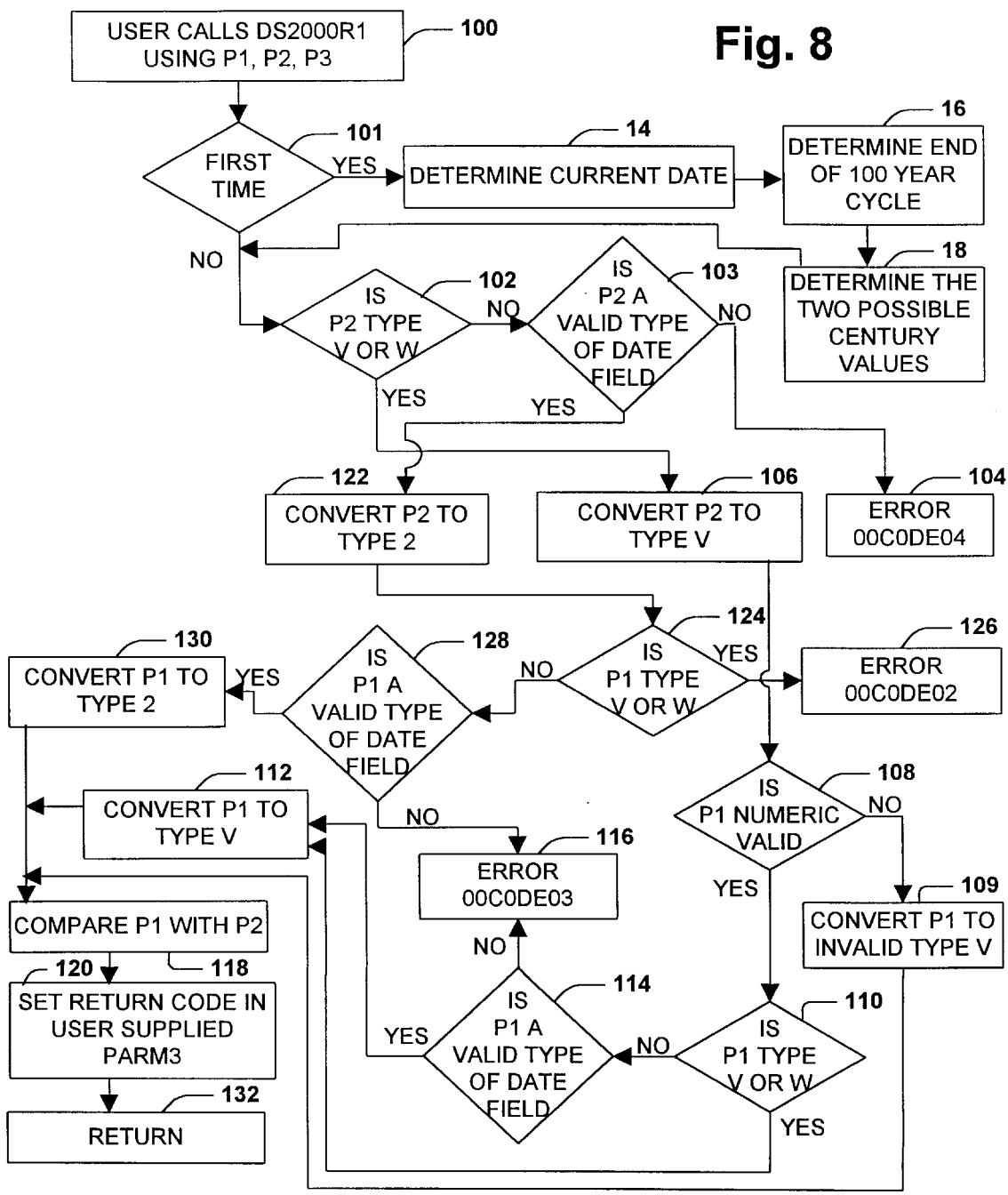
FIG. 8 is a flowchart illustrating the steps the modified computer system performs to compare two date fields.

As illustrated in FIG. 8, the call to DS2000R1 (box 100) is inserted into the application program, and includes parameters P1, P2, and P3. P1 and P2 are the date fields which are to be compared. For example, P1 could be "DATE-NEXT-PAYMENT-DUE" and P2 might be "TODAY" as referenced in the above sample of modified source code. P3 is a three byte field in which the first two bytes define the type of date field P1 and P2, respectively. The third byte is a return code which will be set to a value indicative of the result of the comparison. P3 corresponds to 'PARAMETER 3" in the sample code.

If the call to DS2000R1 (box 100) is the first date operation that this particular application program has had to perform (box 101), then as discussed previously, the subroutine will call another subroutine which determines the current date (box 14), the end of the 100 year cycle (box 16), and the two possible century values for P1 and P2 (box 18) as described above.

Once the above parameters have been calculated, which only needs to be done one time for any run of an application program, the requested date comparison can be performed. The first step is to determine whether the comparison is between two dates or two days. The second byte of P3, which indicates the format of the P2 date field, determines which comparison is to be performed. If the P2 date field is a type V or W date field, then the comparison is a day of the week comparison as opposed to a year-month-day date comparison (box 102). If it is not, then the P2 date field is checked to determine if it is one of the other valid date fields that this system can support (box 103). See the Appendix for a sample of the field types that can be supported. If it is, then it is a valid date comparison. If it is not, then an error is issued indicating that an invalid type of field has been entered (box 104).

If P2 is either a type V or a type W date field, then the next step is to convert P2 to a type V date field (box 106). Obviously, this conversion only takes place if P2 is a type W date field as it is already in proper format if it is a type V date field.

Once P2 has been converted into the proper format, P1 is checked to ensure that it is numerically valid (box 108). There are times that P1 may not be numerically valid. For example, if the information for a particular date field is not known when the file is created, all blanks may be entered into the field reserved for the information. In such cases, the numerically invalid P1 is converted into an invalid type V value (box 109) so that the comparison can still be performed without interrupting the execution of the subroutine and hence the application program. On the other hand, if P1 is numerically valid (box 108), the format of P1 is checked. If P1 is either type V or W (box 110), P1 is converted into a type V format (box 112). However, if P1 is neither type V nor W, P1 is checked to see if it is in fact a valid type of date field (box 114). If it is a valid type of date field, P1 is converted to a type V format (box 112). If it is not a valid type of date field, an error is generated indicating that P1 is an invalid type date field (box 116).

Once both P1 and P2 have been converted to a type V date field, the comparison is performed (box 118). The comparison will be performed even if P1 is converted to an invalid type V value (box 109) so as not to interrupt execution of the subroutine and hence the application program. A return code is placed into the third byte of P3 indicative of the results of the comparison (box 120). For example, if the type V equivalent of P1 is less than the type V equivalent of P2, then an 'X' will be returned. If P1 is equal to P2, then a 'Y' will be returned. Finally, if P1 is greater than P2, then a 'Z' will be returned.

The return codes for this embodiment were selected because the respective values of the characters fall in order in the collating sequence, that is the value of X is less than the value of Y which is less than the value of Z. Thus, the value of the return code need only be compared to the value of 'Y' to determine the result. If the value of the return code is less than 'Y', P1 is less than P2; if the value of the return code is equal to the value of 'Y', P1 and P2 are equal; and if the value of the return code is greater than the value of 'Y', then P1 is greater than P2. If return codes had been selected whose value had not been in order in the collating sequence, multiple comparisons would have been necessary as opposed to just one, as described above. In other words, the return code would have to be compared to the value for each of the codes selected until a match occurred in order to determine the result of the comparison, as opposed to comparing the return code to a single value such as the value for 'Y'. It should be realized, however, that other characters could be used for the return codes.

If P2 is not type V or W (box 102), but is a valid type date field (box 103), then P2 is converted into a type 2 format, i.e., YYYYMMDD (box 122). Next, P1 is checked to determine if it is a type V or W date field (box 124). If it is, an error is generated indicating that P1 is type V or W when P2 is not (box 126). If P1 is not in a type V or W format, it is confirmed that P1 is a valid type date field (box 128). If it is not, an error is generated to that effect (box 116). If P1 is in a valid format, P1 is converted to a type 2 format (box 130). Next, the two fields, now in their equivalent type 2 formats, are compared (box 118), and a return code indicative of the result is placed in the third byte of P3 (box 120), as described above.

Once the comparison, be it a day of week comparison or a year-month-day date comparison, is complete, the system will exit DS2000R1 and return to the application program with the results of the comparison (box 132), which may then proceed on to other program steps of the original (premodification) program code.

DATE CONVERSION

Another possible date operation that could be performed is a conversion of a date from one format to another. To perform this operation, the application program may be modified to include a call to subroutine DS2000R2, the name of which is only exemplary, which would pass parameters P1, P2, and P3 (box 200). By way of example, if the application program was a COBOL program, and if the conversion was from type D format to type G format, then the current program statements would read:

```
    ...
05  OUTPUT-DATE              PIC X(8).
    ...
05  DATE-NEXT-PAYMENT-DUE    PIC 9(7)    COMP3.
    ...
PERFORM 0260-DATE-CONVERT THRU
0260-DATE-CONVERT-END. IF DATE-CONVERT-OK
GO TO 0375-CHECK-ACCOUNT.
    ...
```

According to the invention, the program may be modified to read:

```
    ...
05  OUTPUT-DATE              PIC X(8).
    ...
05  DATE-NEXT-            PIC 9(7)    COMP3.
    PAYMENT-DUE
    ...
DS2000-PARAMETER-3.
05  DS2000-FORMAT-FIELD-A    PIC X(1)   VALUE 'D'.
05  DS2000-FORMAT-FIELD-B    PIC X(1)   VALUE 'G'.
05  DS2000-RETURN-           PIC X(1)   VALUE SPACES.
    CODE
    88 DATE-CONVERSION-                 VALUE '0'.
    OK
    ...
CALL 'DS2000R2' USING DATE-NEXT -PAYMENT-DUE,
OUTPUT-DATE, DS2000-PARAMETER-3.
IF DATE-CONVERSION-OK GO TO 0375-CHECK-ACCOUNT.
    ...
```

Similarly, if the application program was written in ASSEMBLER, the current program statements might be;

```
         ...
OPTDATE DS CL8   OUTPUT DATE, MM/DD/YY.
         ...
NXTPMT DS PL4    DATE-NEXT-PAYMENT-DUE,
                 OYYMMDDS.
         ...
    BAL RE,CVT4DATE CONVERT PL4 DATE TO CL8 DATE
    CLI CVT4STS,C'Y' WAS DATE CONVERSION OK
         ...
```

After the program was modified to use the present invention, it may read:

```
             ...
OPTDATE  DS   CL8   OUTPUT DATE, MM/DD/YY.
             ...
NXTPMT   DS   PL4   DATE-NEXT-PAYMENT-DUE,
                    OYYMMDDS.
             ...
DS2000P3  DS   OX    PARAMETER 3
DS2000FA  DC   C'D'  FORMAT OF DATE FIELD A
DS2000FB  DC   C'G'  FORMAT OF DATE FIELD B
DS2000RC  DC   C''   RETURN CODE: 0, 1, 2, . . .
             ...
    CALL DS2000R2, (NXTPMT,OPTDATE,DS2000P3)
    CLI DS2000RC, C'0' WAS DATE CONVERSION OK
             ...
```

Figure 9:
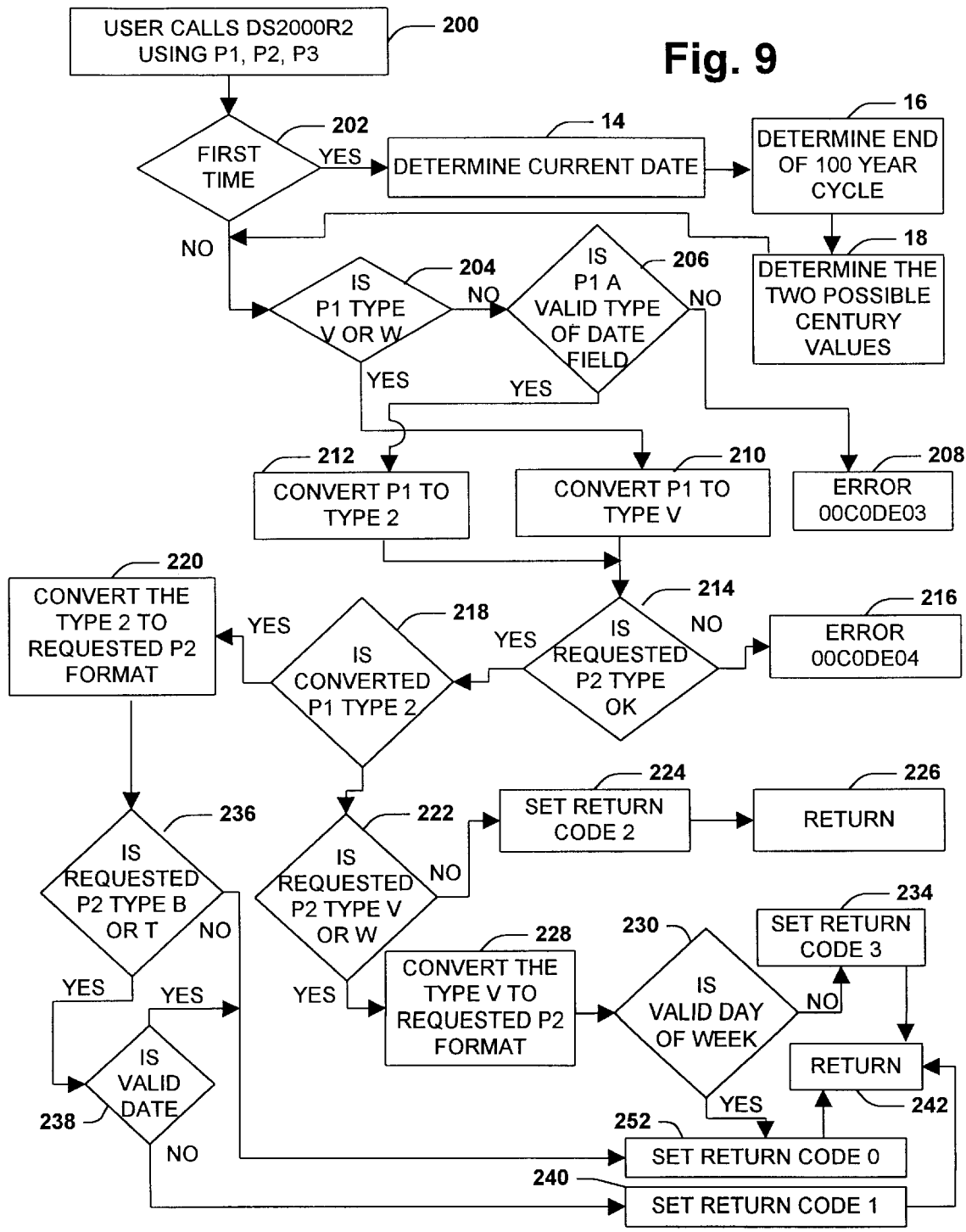
FIG. 9 is a flowchart illustrating the steps the modified computer system performs to convert a date field in one format into a different format.

The operation of DS2000R2 is illustrated in FIG. 9. In this subroutine, P1 will be the date to be converted, P2 is the area in which the subroutine will place the converted date, and P3 is a three byte field in which the first byte indicates the type of date field P1, the second byte indicates the type of date field desired, and the third byte is a return code indicative of the result.

Again, if the call to DS2000R2 happens to be the first call (box 202) the application program encounters, the current date (box 14), end of 100 year cycle (box 16), and the 2 possible century values (box 18) are determined before any date operation is performed. Additionally, P1 is checked to see if it is a type V or W field (box 204), and next if it is one of the other valid date fields (box 206). If P1 is neither, an error message is generated indicating that P1 is not in a format that the subroutine can support (box 208).

If P1 is a type V or W date field, then it is converted to its type V format (box 210). If P1 is some other valid type of date field, then it is converted to its type 2 format (box 212). The dates are converted to the above formats as type V and type 2 are the exemplary base formats from which the date conversion will take place.

Once P1 has been converted, it is checked to ensure that a valid date format to convert P1 into has been requested (box 214). If the requested format is not valid, an error is generated indicative of such (box 216). If the requested format is valid, it is checked to see what format P1 has already been converted into. If P1 is in a type 2 format (box 218), then P1 is converted into the requested format (box 220). If P1 is in a type V format, it is checked to see if the requested format P2 is type V or W (box 222). If the requested format is not type V or W, the return code is set to 2 (box 224), and the system returns to the application program (box 226). The return code of '2' indicates that the conversion cannot take place because P1 is in a type V or W format and the format requested is not type V or W.

If the requested format is type V or W, then P1 is converted to the requested format (box 228), and is then checked to see if it is a valid day of the week (box 230). The day of the week is valid if it has a type V equivalent of 1–7 (representing the days of the week). If the day of the week is valid, then the return code is set to 0 to indicate that the conversion was performed properly (box 232). If the day of the week is invalid, the return code is set to 3 to indicate that date field P2 is invalid (box 234).

Once P1 has been converted from its type 2 format into the requested format (box 220), it is checked to see whether that format is either type S or T (box 236). If it is not, the return code is set to 0 (box 232), indicating that the conversion was completed properly. If the requested format is type S or T, then a validation check is performed (box 238). A valid date is defined as one that has a type 2 equivalent which has a numeric year not equal to 0000, a numeric month not equal to 00 nor greater than 12, and a numeric day not equal to 00 nor greater than the maximum number of days for the associated month and year. If it is a valid date, the return code is set to 0 (box 232). If it is not a valid date, then the return code is set to 1 (box 240), indicating that the date field is invalid. Once the return code has been set, regardless of its value, the system returns to the application program (box 242).

DAYS BETWEEN TWO DATES

Figure 10:
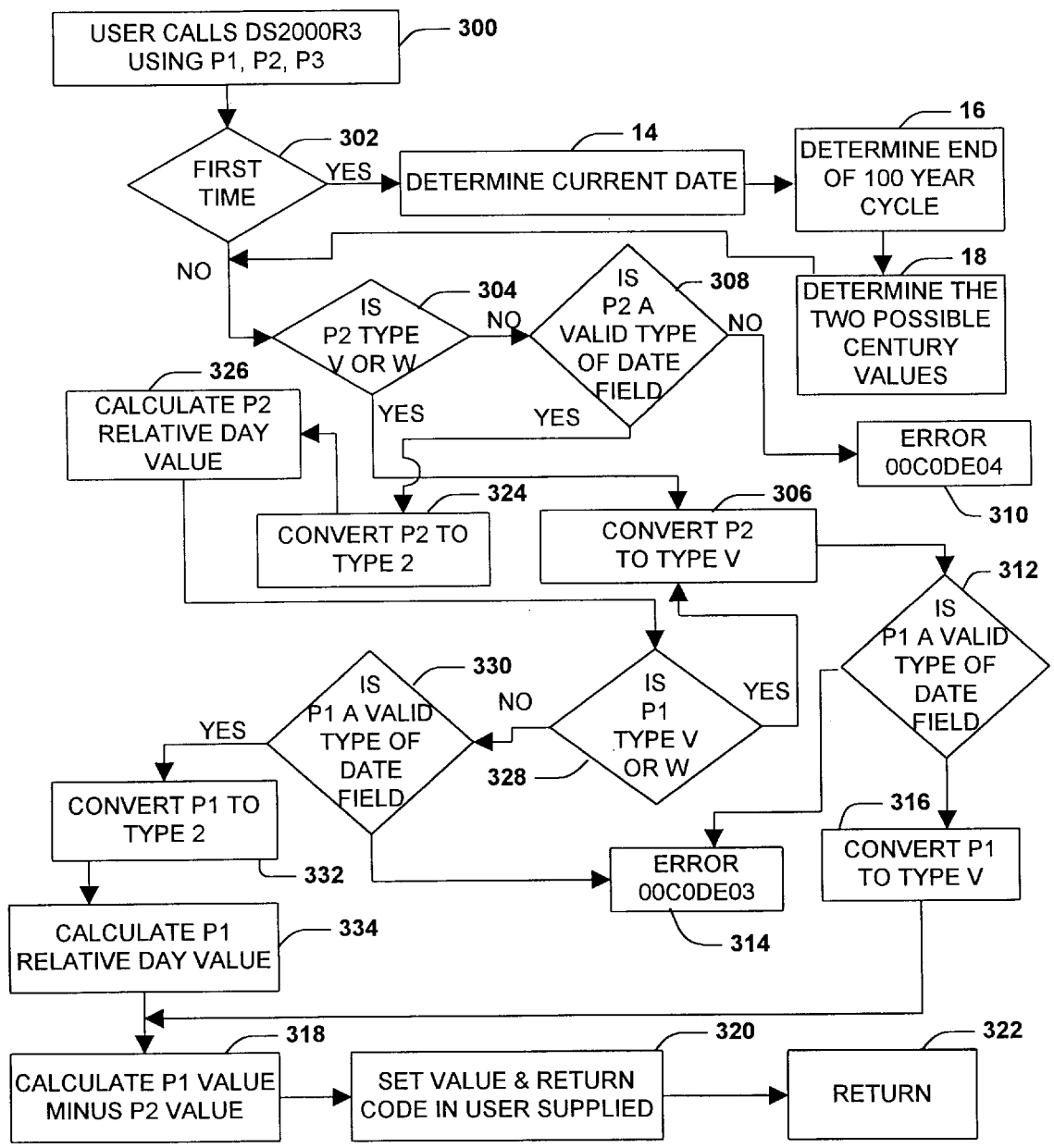
FIG. 10 is a flowchart illustrating the steps the modified computer system performs to calculate the number of days between two date fields.

If an application program needed to determine the number of days between any two given dates, such as a bank needing to know how many days overdue a loan payment was, the application program would be modified at the spot where the calculation was previously done to include a call to subroutine DS2000R3 using P1, P2, and P3 (box 300), as illustrated in FIG. 10. Again, the name assigned to this subroutine, DS2000R3, is only for convenience in referencing this subroutine. If a COBOL program using the type D format for the date field was performing this date calculation, it might read:

```
05      TODAY                   PIC 9(7)      COMP3.
05      DATE-NEXT-PAYMENT-DUE   PIC 9(7)      COMP3.
PERFORM 0130-CALC-DAYS THRU 0130-CALC-DAYS-END.
IF NUMBER-DAYS GREATER THAN ZERO GO TO 0270-ACCT-OK.
```

After the modifications needed to use subroutine DS2000R3 are made, the program may read:

```
05      TODAY                   PIC9(7)       COMP3.
05      DATE-NEXT-PAYMENT-DUE   PIC 9(7)      COMP3.
DS2000-PARAMETER-3.
05      DS2000-FORMAT-FIELD-A   PIC X(1)      VALUE 'D'.
05      DS2000-FORMAT-FIELD-B   PIC X(1)      VALUE 'D'.
05      D52000-RETURN-CODE      PIC X(1)      VALUE SPACES.
        88 DAYS-LESS-THAN-0                   VALUE 'X'.
        88 DAYS-EQUAL-TO-0                    VALUE 'Y'.
        88 DAYS-GREATER-THAN-0                VALUE 'Z'.
05      DS2000-NUMBER-DAYS      PIC S9(7).
CALL 'DS2000R3' USING DATE-NEXT-PAYMENT-DUE, TODAY,
DS2000-PARAMETER-3.
IF DAYS-GREATER-THAN-0 GO TO 0270-ACCT-OK.
```

If an ASSEMBLER program also using the type D format performed the date calculation, it might read:

```
TODAY   DS    PL4            DATE VALUE FOR
                             TODAY, OYYMMDDS.
NXTPMT  DS    PL4            DATE NEXT PAYMENT
                             DUE, OYYMMDDS.
        BAL   RE,CALCDAYS    CALC NUMBER OF DAYS
        CP    NBR4DAYS, = P'0'  NUMBER DAYS GREATER
                             THAN ZERO
        BH    ACCT270        YES, ACCOUNT
                             IS CURRENT
*
```

After the program was modified to use subroutine DS2000R3, it may read:

```
TODAY     DS    PL4          DATE VALUE FOR
                             TODAY, OYYMMDDS.
NXTPMT    DS    PL4          DATE NEXT PAYMENT
                             DUE, OYYMMDDS.
DS2000P3  DS    OX           PARAMETER 3
DS2000FA  DC    C'D'         FORMAT OF DATE
                             FIELD A
DS2000FB  DC    C'D'         FORMAT OF DATE
                             FIELD B
DS2000RC  DC    C"           RETURN CODE: X, Y, or Z.
DS2000ND  DS    PL4          NUMBER OF DAYS
CALL DS2000R3, (NXTPMT,TODAY,DS2000P3)
CP        DS2000ND, = P'0'   NUMBER DAYS GREATER
                             THAN ZERO
BH        ACCT270            YES, ACCOUNT
                             IS CURRENT
```

In this instance, P1 and P2 are the respective date fields, and P3 is a seven byte field, the first two bytes representing the type of fields P1 and P2 respectively, the third byte being a return code indicative of the sign of the number of days between P1 and P2, and the remaining bytes being a return area for the number of days.

Again, if this was the first call that the application program came to (box 302), the current date would be calculated (box 14), the end of the 100 year cycle determined (box 16), and the two possible century values determined (box 18), before beginning the calculation.

If this was not the first call, or the calculations were completed, the second byte of P3 would be examined to determine the format of P2. If P2 were either a type V or W date field (box 304), P2 would be converted to a type V date field (box 306). If it was not a type V or W date field, P2 would be checked to see if it was a valid date field (box 308). Once again, if P2 was not a valid date field, then an error indicating such would be generated (box 310).

If P2 was type V or W initially, at this point it would have been converted to a type V format (box 306). It is now checked to ensure that P1 is a valid type date field (box 312). If it is not, an error is generated indicating such (box 314). If P1 is a valid date field, it will be converted into a type V format (box 316), and then the type V equivalent of P2 will be subtracted from the type V equivalent of P1 (box 318). A return code and the resultant value, including its sign, will be set in bytes 3–7 of P3 (box 320). At this point, the system returns to the application program (box 322).

If P2 was not type V or W, but was a valid type date field, P2 would be converted into its type 2 format (box 324). Once P2 had been converted, the relative day value of P2 would be calculated (box 326). The relative day value is defined as the number of days that have elapsed since Jan. 1, 0001, i.e., the first day of the calendar.

Once the relative day for P2 had been determined, the first byte of P3 would be examined to determine the format of P1. If P1 is a type V or W date field (box 328), both P1 (box 316) and P2 (box 306) would be converted to their type V equivalents and the difference between the two calculated (box 318). The difference would be set into P3 (box 320) and the system would return to the application program (box 322).

If P1 is not a type V or W date field, but is a valid date field (box 330), P1 would be converted to its type 2 format (box 332). The relative day value for P1 would be calculated (box 334), and the relative day value of P2 is subtracted from the relative day value of P1 (box 318). A return code and this value, including its sign, would be set into bytes 3–7 of P3 (box 320). The system then exits routine DS2000R3 and returns to the application program (box 322).

The aforementioned date operations are but exemplary of the many different date operations that a computer system modified in accordance with the present invention may perform. Accordingly, the principles of the present invention may be employed in computer systems performing date operations not specifically discussed or described herein.

Although the invention has been shown and described with respect to an exemplary embodiment thereof, it is obvious that equivalent alterations and modifications will occur to others skilled in the art upon the reading and understanding of the specification. The present invention includes all such equivalent alterations and modifications, and is limited only by the scope of the following claims.

APPENDIX

| Date Type | Cycle/ Range | Date Format | Field Length | Digit Order | Special Notes |
|---|---|---|---|---|---|
| A | C1 | CHARACTER | 6 | MMDDYY | |
| B | C1 | CHARACTER | 6 | YYMMDD | |
| C | C1 | PACKED SIGNED | 4 | 0MMDDYYS | |
| D | C1 | PACKED SIGNED | 4 | 0YYMMDDS | |
| E | C1 | PACKED UNSIGNED | 3 | MMDDYY | |
| F | C1 | PACKED UNSIGNED | 3 | YYMMDD | |
| G | C1 | CHARACTER | 8 | MM/DD/YY | |
| H | C1 | CHARACTER | 8 | YY/MM/DD | |
| I | C1 | PACKED SIGNED | 4 | YYYMMDDS | (6) |
| J | C1 | CHARACTER | 5 | YYDDD | |
| K | C1 | PACKED SIGNED | 3 | YYDDDS | |
| L | C2 | CHARACTER | 7 | YYYYDDD | |
| M | C2 | PACKED SIGNED | 4 | YYYYDDDS | |
| N | C2 | CHARACTER | 7 | DDDDDDD | (1) |
| O | C2 | PACKED SIGNED | 4 | DDDDDDDS | (1) |
| P | R1 | PACKED SIGNED | 4 | 0MMDDYYS | (7) |
| Q | R1 | PACKED SIGNED | 4 | YYYMMDDS | (9) |
| R | R1 | PACKED SIGNED | 3 | YYDDDS | (7) |
| S | C1 | BINARY | 2 | YYMMDD | |
| T | C1 | BINARY | 2 | YYYMMDD | (5) |
| U | R2 | BINARY | 2 | DDDDD | (2) |
| V | C3 | CHARACTER | 1 | D | (3) |
| W | C3 | CHARACTER | 9 | DAYOFWEEK | (4) |
| X | R1 | CHARACTER | 6 | MMDDYY | (8) |
| Y | R1 | CHARACTER | 6 | YYMMDD | (8) |
| Z | R1 | CHARACTER | 5 | YYDDD | (8) |
| 0 | C2 | PACKED SIGNED | 4 | YYYYDDDS | (10) |
| 1 | C2 | CHARACTER | 8 | MMDDYYYY | |
| 2 | C2 | CHARACTER | 8 | YYYYMMDD | |
| 3 | C2 | PACKED SIGNED | 5 | 0MMDDYYYYS | |
| 4 | C2 | PACKED SIGNED | 5 | 0YYYYMMDDS | |
| 5 | C2 | PACKED UNSIGNED | 4 | MMDDYYYY | |
| 6 | C2 | PACKED UNSIGNED | 4 | YYYYMMDD | |
| 7 | C2 | CHARACTER | 10 | MM/DD/YYYY | |
| 8 | C2 | CHARACTER | 10 | YYYY/MM/DD | |
| 9 | C2 | CHARACTER | 8 | YYYYMMDD | (0) |

APPENDIX-continued

| Date Type | Cycle/ Range | Date Format | Field Length | Digit Order | Special Notes |
|---|---|---|---|---|---|

C1 = THE DATE CYCLE IS 100 YEARS
C2 = THE DATE CYCLE IS 10000 YEARS
C3 = THE DATE CYCLE IS 7 DAYS
R1 = THE DATE RANGE IS 1/1/1900 THROUGH 12/31/2099
R2 = THE DATE RANGE IS 1/1/1900 THROUGH 06/04/2079
Y = YEAR DIGIT, M = MONTH DIGIT, D = DAY DIGIT, AND S = SIGN
(0) = DATE TYPE 9 IS THE TYPE 2 EQUIVALENT OF TODAY'S DATE
(1) = DATE TYPES N AND O ARE THE RELATIVE DAY STARTING 1/1/0001
(2) = DATE TYPE U IS THE RELATIVE DAY STARTING 1/1/1900
(3) = DATE TYPE V IS THE DAY OF WEEK, E.G., 1 = MON., 2 = TUE., . . . 7 = SUN.
(4) = DATE TYPE W IS THE DAY OF WEEK, E.G., 'WEDNESDAY', 'THURSDAY' . . .
(5) = DATE TYPE HAS UNIQUE VALUES FOR THE YEARS 2000 THROUGH 2027 THAT ARE DETERMINED BY THE YEAR VALUES FROM 100 THROUGH 127
(6) = DATE TYPE HAS UNIQUE VALUES FOR THE YEARS 2000 THROUGH 2099 THAT ARE DETERMINED BY THE YEAR VALUES FROM 100 THROUGH 199
(7) = DATE TYPE HAS UNIQUE VALUES FOR THE YEARS 1900 THROUGH 2099 THAT ARE DETERMINED BY THE SIGN VALUE, I.E., 19XX IF + AND 20XX IF −
(8) = DATE TYPE HAS UNIQUE VALUES FOR THE YEARS 1900 THROUGH 2099 THAT ARE DETERMINED BY SIGN VALUE ON THE TENS DIGIT OF THE YEAR, I.E., 19XX IF = AND 20XX IF −
(9) = DATE TYPE HAS UNIQUE VALUES FOR THE YEARS 1900 THROUGH 2099 THAT ARE DETERMINED BY THE YEAR VALUES FROM 000 THROUGH 199
(10) = THE MVS JULIAN DATE FORMAT, THE CENTURY DIGITS ARE 00 FOR 19, 01 FOR 20, 02 FOR 21, ETC.

I claim:

1. A method of modifying a computer system that is not year 2000 compliant, comprising the steps of:

storing at least one subroutine in a memory accessible to the computer system; and modifying an existing application program of said computer system to include a call to said at least one subroutine, said call operative to pass to said subroutine at least one date field representative of two dates respectively in the 20th and 21st centuries, wherein said at least one subroutine determines which of said two dates corresponds to said date field according to a predetermined criteria, performs a date operation on said date field, and returns a parameter to said application program for use in further operations.

2. A method according to claim 1, wherein said at least one subroutine converts said date field into a new format.

3. A method according to claim 2, wherein said said at least one subroutine assigns a century value to said date field to convert said date field into a format with a four digit representation for the year.

4. A method according to claim 1, wherein said parameter is a date field.

5. A method according to claim 1, wherein said parameter is a code indicative of a result of said date operation having been performed.

6. A method according to claim 1, wherein two date fields are passed to said at least one subroutine, each of said two date fields being representative of two dates respectively in the 20th and 21st centuries.

7. A method according to claim 6, wherein said step of determining includes converting each of said date fields into a new format having at least a three digit representation for the year.

8. A method according to claim 7, including the step of assigning a century value to each of said at least two date fields.

9. A method according to claim 7, wherein said at least one subroutine converts said two date fields into the same format before performing said date operation.

10. A method according to claim 1, wherein said date operation is at least one of a group consisting of a date conversion operation, a date comparison operation, a date difference calculation operation, and a date validation.

11. A computer system modified in accordance with the method of claim 1.

12. A method according to claim 1, wherein said at least one subroutine converts a date field into a new format and then performs a date operation on said date field in said new format.

13. A method of operating a computer system so as to perform date operations on date fields comprising the steps of:

calling at least one subroutine from an application program, said at least one subroutine for performing a date operation;

passing at least one date field, which is representative of two dates respectively in the 20th and 21st centuries, to said at least one subroutine;

determining which of said at least two dates corresponds to said date field according to a predetermined criteria;

performing said date operation on said date field; and returning a parameter from said at least one subroutine to said application program for use in further operations.

14. A method according to claim 13, wherein said date field has a two digit representation of the year.

15. A method according to claim 14, wherein said step of determining includes assigning a century value to said date field to convert said date field into a format with a four digit representation of the year.

16. A method according to claim 13, wherein said date operation is performed on said date field after said date field has been converted to a new format.

17. A method according to claim 13, wherein two date fields are passed to said subroutine.

18. A method of modifying a computer system that is controlled by an application program that uses date fields including a two digit year format, comprising the steps of:

storing a subroutine in a memory accessible to the computer system; and modifying the application program to include a call to the subroutine, the call operative to pass a date field to the subroutine, which passed date field includes a two digit year format; the subroutine being operative to assign a four digit year format to the date field according to a predetermined criteria.

19. A method according to claim 18, wherein the subroutine is operative to perform a date operation on the date field including the four digit year format, the date operation being either a date comparison operation or a date difference operation.

* * * * *